(12) United States Patent
Hsing et al.

(10) Patent No.: US 11,289,984 B2
(45) Date of Patent: Mar. 29, 2022

(54) BEARINGLESS MOTOR AND LOAD MECHANISM HAVING SHAFT WITH LOOSE-PROOF ASSEMBLY

(71) Applicant: DELTA ELECTRONICS, INC., Taoyuan (TW)

(72) Inventors: Lei-Chung Hsing, Taoyuan (TW); Chien-Chung Shih, Taoyuan (TW); Yu-Lin Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 534 days.

(21) Appl. No.: 16/225,723

(22) Filed: Dec. 19, 2018

(65) Prior Publication Data

US 2019/0280578 A1 Sep. 12, 2019

(30) Foreign Application Priority Data

Mar. 7, 2018 (CN) .......................... 201810187924.5

(51) Int. Cl.
| | |
|---|---|
| H02K 7/00 | (2006.01) |
| H02K 16/02 | (2006.01) |
| F16C 32/04 | (2006.01) |
| H02K 7/09 | (2006.01) |
| H02K 7/08 | (2006.01) |
| H02K 7/14 | (2006.01) |
| H02K 1/2733 | (2022.01) |

(52) U.S. Cl.
CPC ......... *H02K 16/02* (2013.01); *F16C 32/0497* (2013.01); *H02K 1/2733* (2013.01); *H02K 7/003* (2013.01); *H02K 7/085* (2013.01); *H02K 7/09* (2013.01); *H02K 7/14* (2013.01); *H02K 2213/03* (2013.01)

(58) Field of Classification Search
CPC ...... H02K 16/02; H02K 1/2733; H02K 7/003; H02K 7/085; H02K 7/09; H02K 7/14; H02K 2213/03; F16C 3/0497
USPC ........................................... 310/90.5, 51, 90
See application file for complete search history.

(56) References Cited

U.S. PATENT DOCUMENTS

| | | | | |
|---|---|---|---|---|
| 4,286,187 A | * | 8/1981 | Binder ................. | H02K 7/1815 310/112 |
| 7,417,345 B2 | * | 8/2008 | Chen ..................... | F04D 25/062 310/90.5 |

(Continued)

FOREIGN PATENT DOCUMENTS

| | | | |
|---|---|---|---|
| CN | 203398927 U | | 1/2014 |
| CN | 105656269 A | * | 6/2016 |

(Continued)

OTHER PUBLICATIONS

CN-105656269-A English Translation.*

(Continued)

*Primary Examiner* — Maged M Almawri
(74) *Attorney, Agent, or Firm* — Muncy, Geissler, Olds & Lowe, P.C.

(57) ABSTRACT

A bearingless motor is provided. The bearingless motor primarily includes a rotor module and a stator. The rotor module includes a plurality of rotor elements, and the stator includes a housing that forms a receiving space for receiving the rotor module, wherein the rotor module is rotatable relative to the stator.

11 Claims, 8 Drawing Sheets

(56) References Cited

U.S. PATENT DOCUMENTS

| | | | | |
|---|---|---|---|---|
| 8,836,194 | B2* | 9/2014 | Smirnov | H02K 7/085 |
| | | | | 310/156.04 |
| 9,312,736 | B2* | 4/2016 | Gutjahr | H02K 7/14 |
| 9,515,531 | B2* | 12/2016 | Jansen | H02P 9/02 |
| 10,047,754 | B2* | 8/2018 | Hiramoto | F04D 19/002 |
| 10,177,627 | B2* | 1/2019 | Noh | F04D 25/0606 |
| 2007/0230839 | A1* | 10/2007 | Childe | F16C 35/077 |
| | | | | 384/58 |
| 2007/0241627 | A1* | 10/2007 | Kharsa | F04C 29/0085 |
| | | | | 310/156.08 |
| 2010/0231076 | A1* | 9/2010 | Chiba | H02K 7/09 |
| | | | | 310/90.5 |
| 2013/0343927 | A1* | 12/2013 | Ramdane | F16C 32/0497 |
| | | | | 417/365 |
| 2014/0023534 | A1* | 1/2014 | Ramdane | F16C 32/0495 |
| | | | | 417/420 |
| 2020/0149586 | A1* | 5/2020 | Candelaria | F16C 32/0476 |
| 2020/0392961 | A1* | 12/2020 | Holenstein | F04D 19/002 |

FOREIGN PATENT DOCUMENTS

| | | |
|---|---|---|
| CN | 105680609 A | 6/2016 |
| CN | 105805303 A | 7/2016 |
| CN | 106487125 A | 3/2017 |
| JP | 2013038945 | 2/2013 |

OTHER PUBLICATIONS

Office Action of corresponding TW application 107107650 dated Dec. 5, 2018.

Office Action dated Jan. 21, 2020 in CN Application No. 201810187924.5.

* cited by examiner

BEARINGLESS MOTOR AND LOAD MECHANISM HAVING SHAFT WITH LOOSE-PROOF ASSEMBLY

CROSS REFERENCE TO RELATED APPLICATIONS

The present application is based on, and claims priority from, China Patent Application No. 201810187924.5, filed on Mar. 7, 2018, the disclosure of which is hereby incorporated by reference herein in its entirety.

BACKGROUND OF THE INVENTION

Field of the Invention

The application relates in general to a motor mechanism, and in particular, to a motor mechanism having a common shaft and a plurality of rotor elements.

Description of the Related Art

Conventional motors usually have a shaft coupling element to couple the shaft of the rotor with the shaft of the load mechanism, so that the rotor can drive the load mechanism to operate. However, traditional shaft coupling elements may be large and may reduce the efficiency of the system. Additionally, coaxial errors may occur between the shafts of the rotor and the load mechanism, and all of the shafts need their own bearings to support them, thus increasing the number of components and the production cost.

BRIEF SUMMARY OF INVENTION

In view of the aforementioned problems, the object of the invention is to provide a mechanical device that includes a bearingless motor and a load mechanism. The bearingless motor includes a rotor module and a stator, wherein the rotor module includes a plurality of rotor elements. The rotor module is disposed in the stator and rotatable relative to the stator. The load mechanism includes a load mechanism input shaft and a main body. The load mechanism input shaft The load mechanism input shaft has a first end and a second end, wherein the first end of the load mechanism input shaft is extended to the inside of the rotor module to serve as a power output shaft of the bearingless motor. The rotor elements are disposed around the first end of the load mechanism input shaft. The main body is disposed around the second end of the load mechanism input shaft, wherein the second end of the load mechanism input shaft is located in the main body.

In some embodiments, the rotor module further includes a first fixed member and a second fixed member, wherein the rotor elements are disposed between the first and second fixed members and surround the first end of the load mechanism input shaft, and the first and second fixed members secure the rotor elements on the load mechanism input shaft.

In some embodiments, the load mechanism input shaft further has an abutting surface substantially perpendicular to the axial direction of the load mechanism input shaft and abutting the first fixed member.

In some embodiments, the bearingless motor further includes an end cover disposed at an end of the stator.

In some embodiments, the rotor module further includes a loose-proof assembly disposed around the load mechanism input shaft and abutting the second fixed member, to prevent the rotor elements and the first and second fixed members from becoming separated from the load mechanism input shaft.

In some embodiments, the load mechanism input shaft further has a fixed surface forming a threaded structure corresponding to the loose-proof assembly.

In some embodiments, the loose-proof assembly includes a loose-proof nut and a loose-proof washer, and the loose-proof washer is disposed between the loose-proof nut and the second fixed member.

In some embodiments, the loose-proof nut forms at least a recess, and the loose-proof washer forms at least a fin folded into the recess, wherein the width of the recess is substantially equal to the width of the fin.

In some embodiments, the load mechanism further includes a load mechanism flange connected to the main body.

In some embodiments, the load mechanism flange has a load mechanism flange surface, and the stator includes a housing having a stator flange surface, wherein the load mechanism flange surface and the stator flange surface are substantially parallel to an axis direction of the load mechanism input shaft and in contact with each other.

In some embodiments, the load mechanism further includes a fastener extended through the load mechanism flange to affix the load mechanism to the stator.

In some embodiments, the load mechanism further includes a bearing disposed on the inner side of the load mechanism and around the second end of the load mechanism input shaft.

Another object of the invention is to provide a bearingless motor that includes a rotor module and a stator. The rotor module includes a plurality of rotor elements. The stator includes a housing having a receiving space for receiving the rotor module, wherein the rotor module is rotatable relative to the stator.

In some embodiments, there is no bearing disposed in the receiving space of the housing.

BRIEF DESCRIPTION OF DRAWINGS

The invention can be more fully understood by reading the subsequent detailed description and examples with references made to the accompanying drawings, wherein.

DETAILED DESCRIPTION OF INVENTION

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1A:
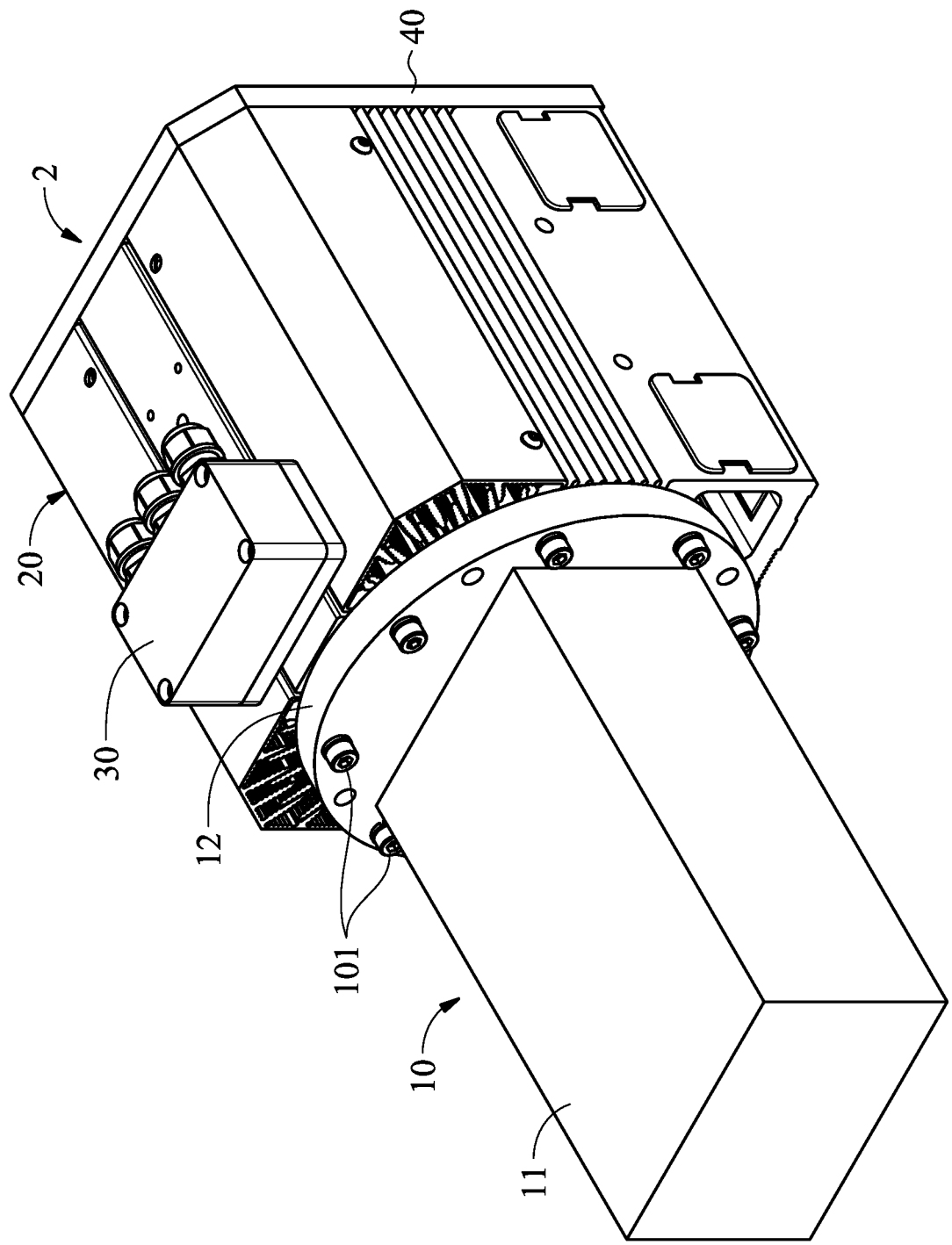
FIG. 1A is a schematic diagram of a mechanical device according to an embodiment of the invention.
Figure 1B:
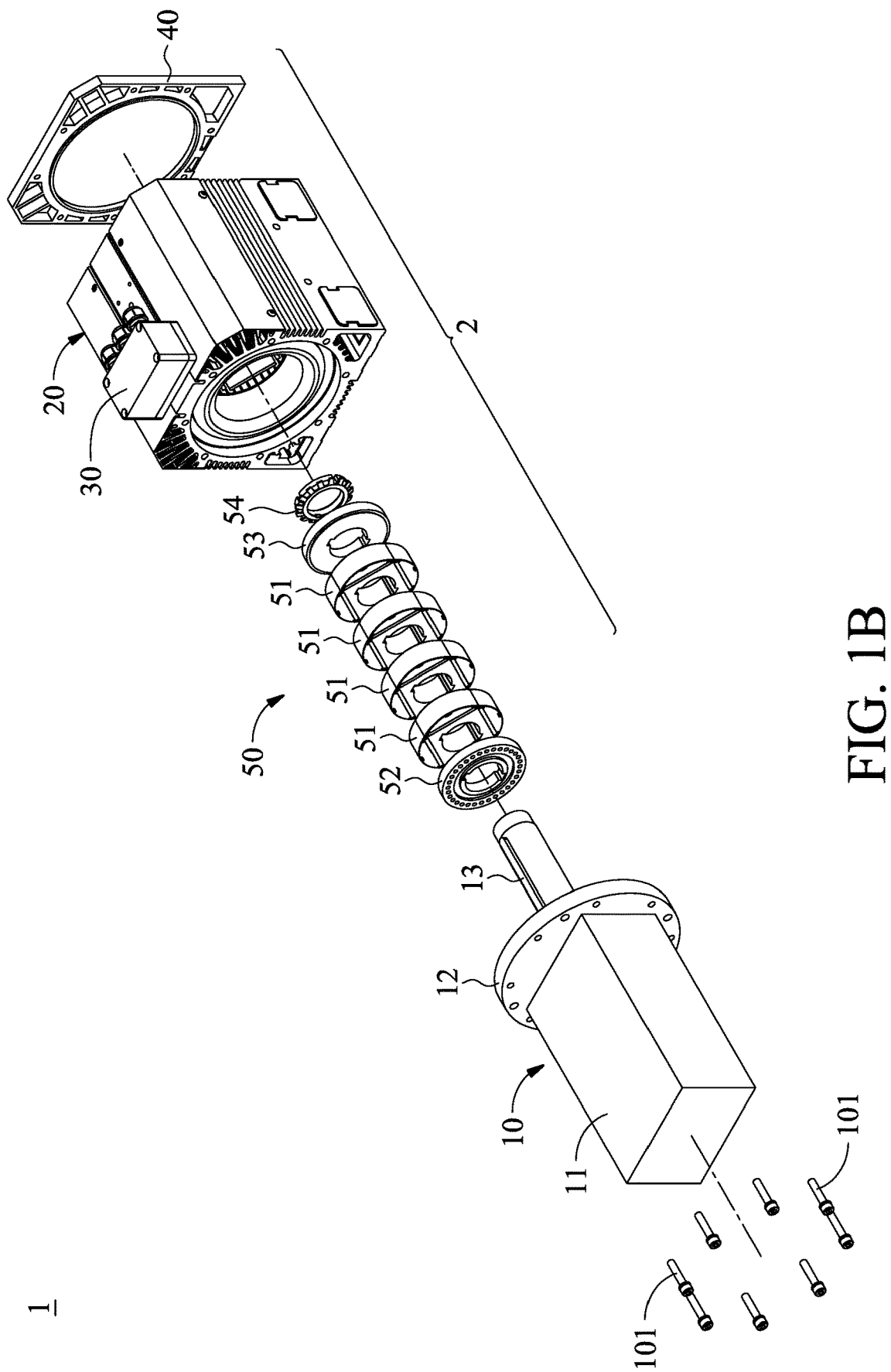
FIG. 1B is an exploded diagram of the mechanical device in FIG. 1A.
Figure 1C:
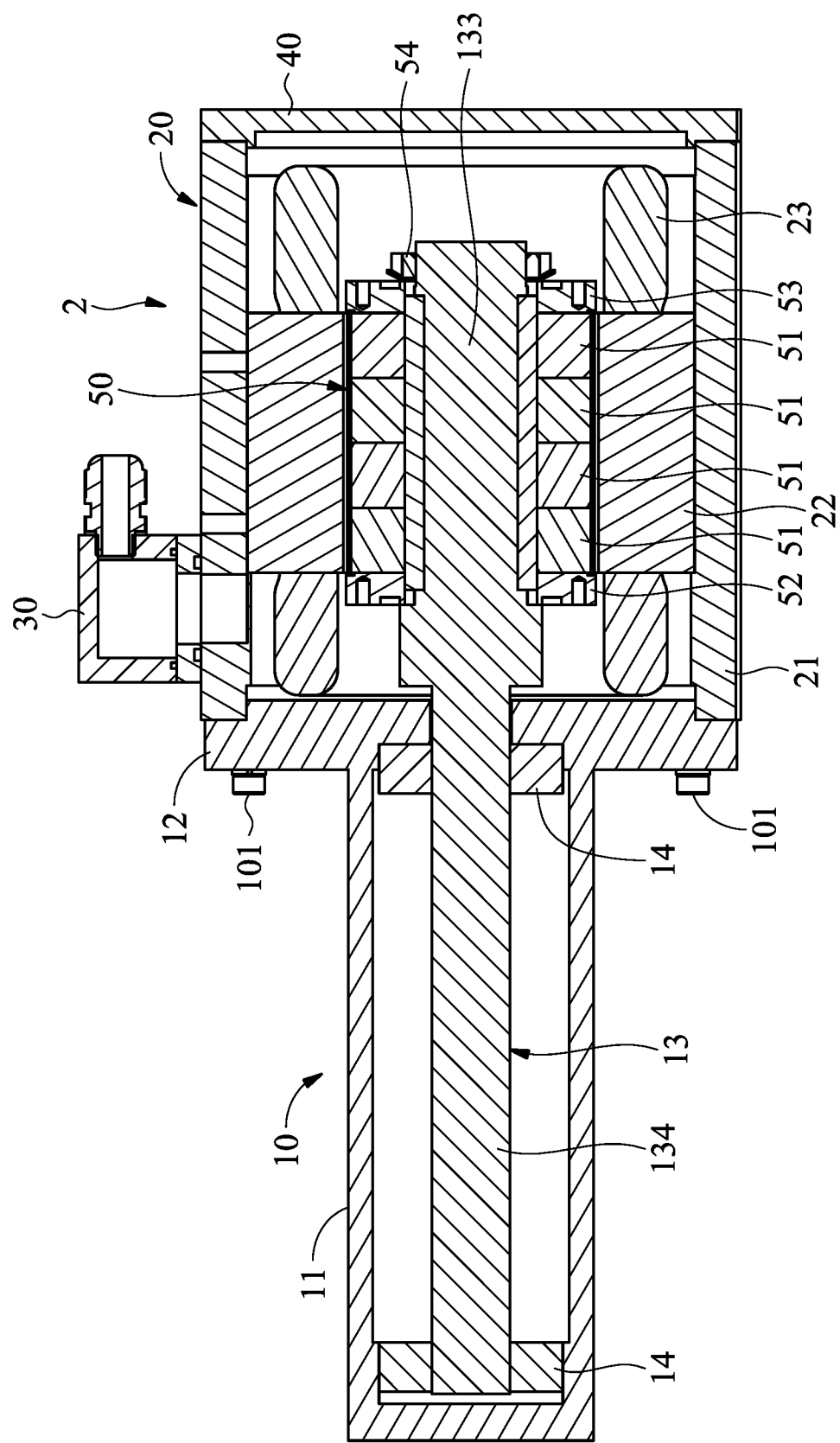
FIG. 1C is a cross-sectional view of the mechanical device in FIG. 1A.

Referring to FIGS. 1A to 1C, an embodiment of a mechanical device 1 comprises a load mechanism 10 and a bearingless motor 2, wherein the bearingless motor 2 comprises a stator 20, a circuit box 30, an end cover 40, and a rotor module 50. The rotor module 50 is disposed in the stator 20, and the load mechanism 10 is connected to the rotor module 50 and the stator 20. The load mechanism 10 and the rotor module 50 can be driven to rotate relative to the stator 20 by the circuits in the circuit box 30, wherein the circuit box 30 is disposed outside the stator 20. The end cover 40 is disposed at an end of the stator 20 to protect the internal structures inside the mechanical device 1.

As shown in FIGS. 1B and 1C, the load mechanism 10 of this embodiment comprises a main body 11, a load mechanism flange 12, a load mechanism input shaft 13, a bearing 14, and at least a fastener 101. The load mechanism input shaft 13 has a first end 133 and a second end 134, and the main body 11 connects to the load mechanism flange 12. The main body 11 surrounds the second end 134 of the load mechanism input shaft 13, so that the second end 134 of the load mechanism input shaft 13 is located on the inside of the load mechanism 10. Additionally, the first end 133 of the load mechanism input shaft 13 is extended to the inside of the rotor module 50, and the fastener 101 is fastened through the load mechanism flange 12 to affix the load mechanism 10 to the stator 20. The bearing 14 surrounds the second end 134 of the load mechanism input shaft 13 and is disposed on the inside of the load mechanism 10 to sustain the load mechanism input shaft 13. The stator 20 comprises a housing 21, a silicon steel sheet 22, and a winding 23, wherein the silicon steel sheet 22 and the winding 23 are disposed on the outer side of the rotor module 50. The housing 21 forms a receiving space for receiving the rotor module 50 and a part of the load mechanism input shaft 13, wherein the housing 21 is disposed on the outer side of the silicon steel sheet 22 and the winding 23.

The rotor module 50 comprises a plurality of rotor elements 51, a first fixed member 52, a second fixed member 53, and a loose-proof assembly 54. The load mechanism input shaft 13 is disposed on the inner side of the rotor module 50, and the rotor elements 51 are disposed around the load mechanism input shaft 13, so that both the rotor module 50 and the load mechanism 10 can directly use the load mechanism input shaft 13 as a power output shaft of the bearingless motor 2. Hence, the mechanical device 1 does not need additional elements to couple the shaft of the rotor with the shaft of the load mechanism 10, so as to prevent large dimensions and efficiency reduction of the mechanical system due to the shaft coupling elements. Since both the rotor module 50 and the load mechanism 10 can directly use the load mechanism input shaft 13 as the power output shaft of the mechanical device 1, coaxial misalignment therebetween can be eliminated. Moreover, as only one bearing 14 disposed on the second end 134 of the load mechanism input shaft 13 is needed, the housing 21 does not require additional space for receiving other bearings for the load mechanism input shaft 13, thus reducing production cost and dimensions of the motor. It should be further noted that, because the bearing 14 is a part of the motor which is easy to be worn and damaged, the reliability of the motor would be increased if the number of bearings is reduced.

In another aspect, since the rotor module 50 comprises a plurality of rotor elements 51, the number of rotor elements 51 can be adjusted to meet the size and specification of the bearingless motor 2, thereby enhancing flexibility of usage. Additionally, during functional test or maintenance the bearingless motor 2, only the rotor elements 51 need to be detached from the bearingless motor 2. Furthermore, if the rotors are damaged, some of the rotor elements 51 can be replaced without changing the whole rotor module 50, thus saving time and cost for functional test and maintenance.

Referring to FIG. 1C, in this embodiment, the first fixed member 52, the second fixed member 53, the loose-proof assembly 54 are disposed around the first end 133 of the load mechanism input shaft 13, wherein the loose-proof assembly 54 abuts the second fixed member 53. The first fixed member 52 is disposed between the load mechanism 10 and the rotor elements 51, and the second fixed member 53 is disposed between the end cover 40 and the rotor elements 51, so as to secure the rotor elements 51 on the load mechanism input shaft 13. The loose-proof assembly 54 is disposed between the second fixed member 53 and the end cover 40, to prevent the rotor elements 51, the first fixed member 52, and the second fixed member 53 from being separated from the load mechanism input shaft 13.

Figure 2B:
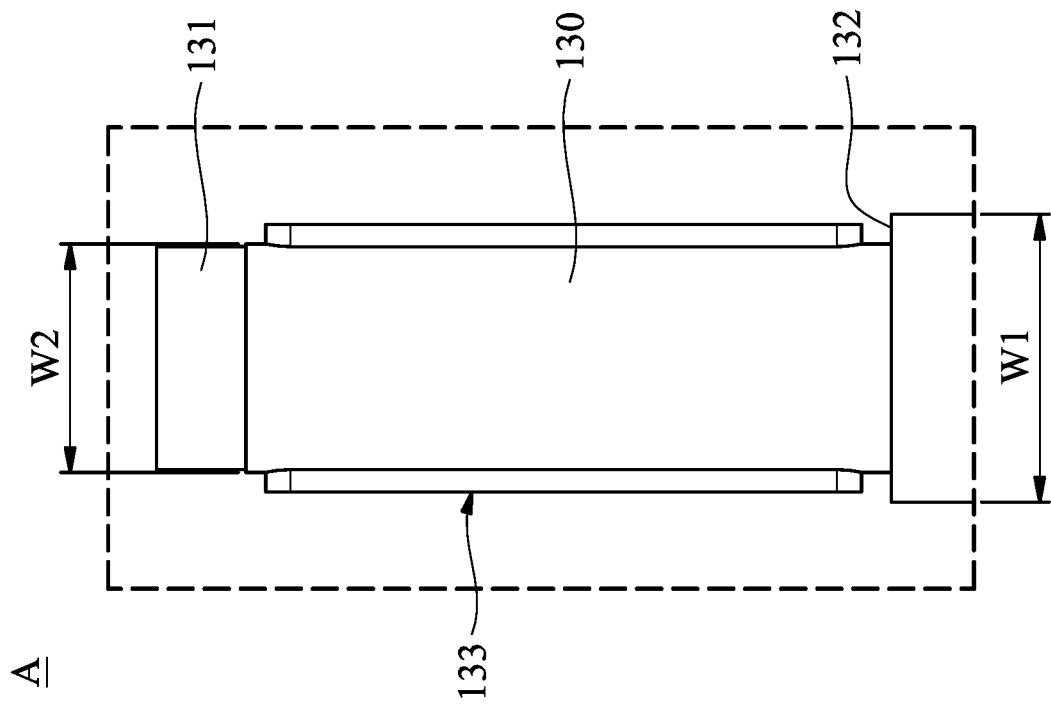
FIG. 2B is an enlarged view of the portion A in FIG. 2A.
Figure 2A:
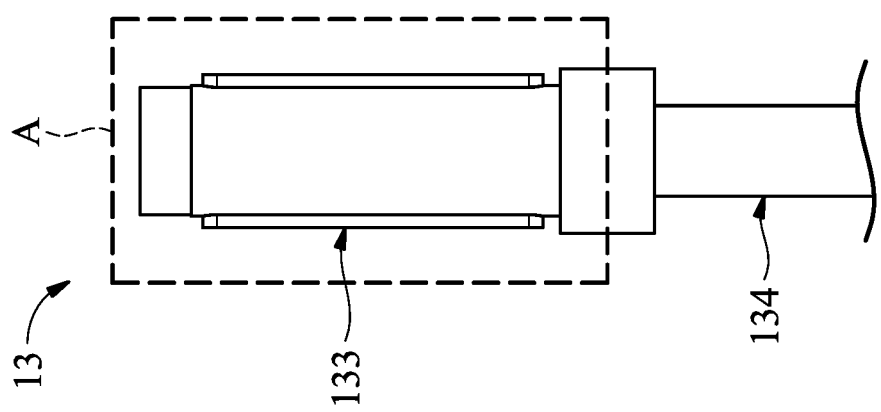
FIG. 2A is a schematic diagram showing a part of the load mechanism input shaft 13 in FIGS. 1B and 1C.

FIGS. 2A and 2B show a portion A of the load mechanism input shaft 13. As shown in FIGS. 2A and 2B, the load mechanism input shaft 13 has a fixed surface 131 at an end (first end 133) thereof near the end cover 40. The loose-proof assembly 54 is disposed around the fixed surface 131, and a part of the load mechanism input shaft 13 near the load mechanism flange 12 has an abutting surface 132 substantially perpendicular to the axial direction of the load mechanism input shaft 13. Here, the abutting surface 132 has a diameter W1 perpendicular to the axial direction of the load mechanism input shaft 13, and a housed portion 130 of the load mechanism input shaft 13 has a diameter W2 perpendicular to the axial direction of the load mechanism input shaft 13, wherein the rotor elements 51 surround the housed portion 130, and the diameter W1 is greater than the diameter W2.

Figure 3B:
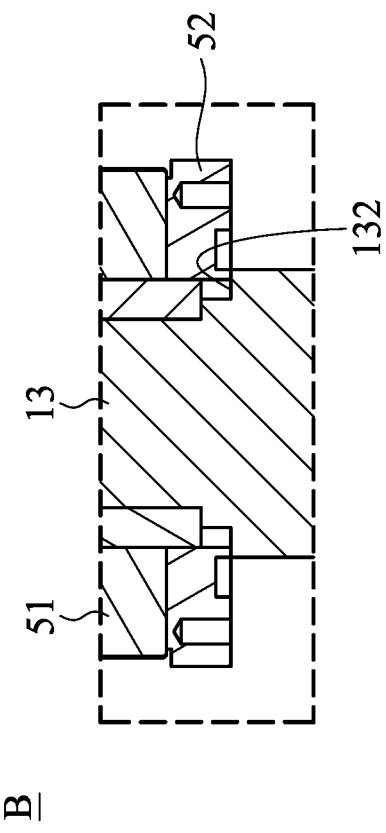
FIG. 3B is an enlarged cross-sectional view of the portion B in FIG. 3A.
Figure 3A:
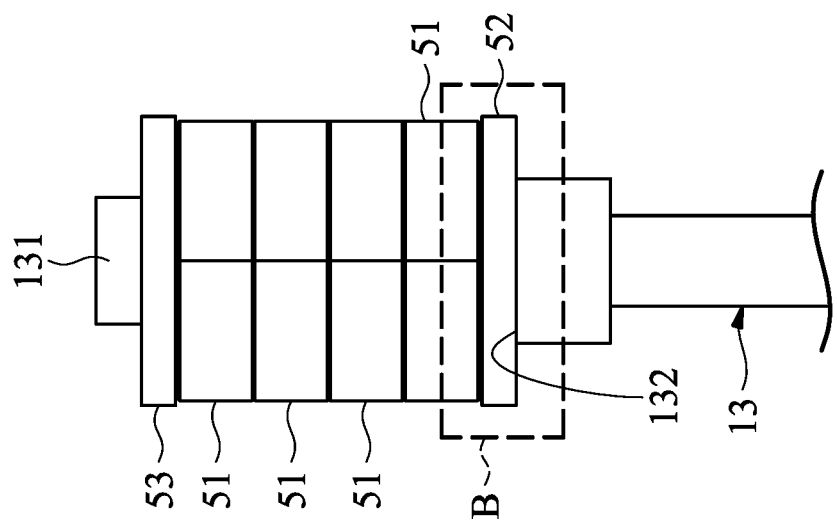
FIG. 3A is a schematic diagram showing a part of the load mechanism input shaft 13, the rotor elements 51, the first fixed member 52, and the second fixed member 53 in FIGS. 1B and 1C.

FIGS. 3A and 3B show a partial structure of the load mechanism input shaft 13, the rotor elements 51, the first fixed member 52, and the second fixed member 53. In this embodiment, the abutting surface 132 abuts the first fixed member 52, to enhance stability of connection between the rotor module 50 and the load mechanism input shaft 13.

Figure 4B:
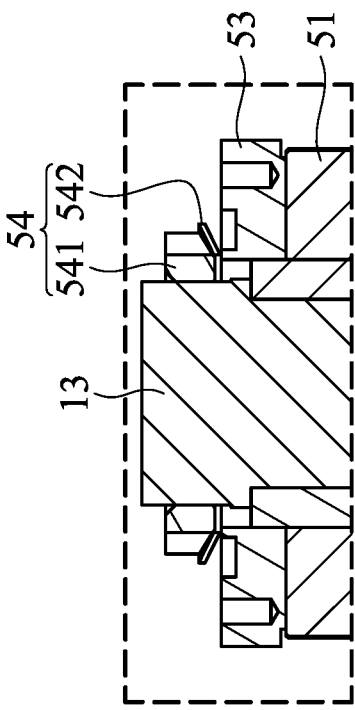
FIG. 4B is an enlarged cross-sectional view of the portion C in FIG. 4A.
Figure 4C:
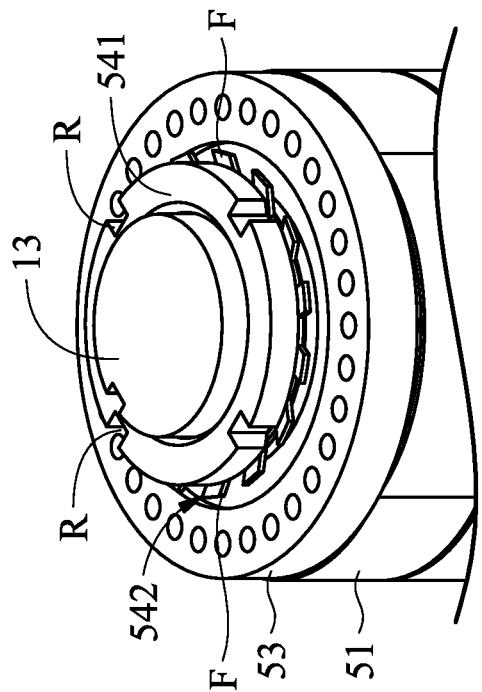
FIG. 4C is a partial perspective diagram showing the load mechanism input shaft 13, the rotor elements 51, the second fixed member 53, and the loose-proof assembly 54 in FIG. 4A.
Figure 4A:
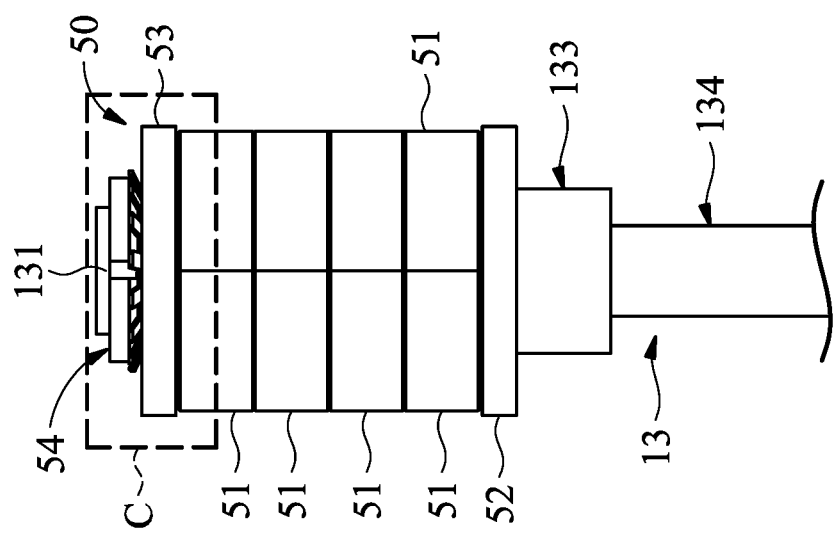
FIG. 4A is a schematic diagram showing a part of the load mechanism input shaft 13, the rotor elements 51, the first fixed member 52, the second fixed member 53, and the loose-proof assembly 54 in FIGS. 1B and 1C after assembly.

FIGS. 4A to 4C show a partial structure of the load mechanism input shaft 13, the rotor elements 51, the first fixed member 52, the second fixed member 53, and the loose-proof assembly 54 after assembly. In this embodiment, the loose-proof assembly 54 comprises a loose-proof nut 541 and a loose-proof washer 542 disposed between the loose-proof nut 541 and the second fixed member 53. Here, the fixed surface 131 may form a threaded structure firmly joined with the loose-proof nut 541. It should be noted that the loose-proof nut 541 has at least a recess R, and the loose-proof washer 542 has at least a fin F (as shown in FIG. 4C), wherein the width of the recess R substantially equals the width of the fin F. When the loose-proof nut 541 is secured to the fixed surface 131 in a specific position, the fin F of the loose-proof washer 542 can be folded and joined in the recess R of the loose-proof nut 541, so as to prevent the loose-proof nut 541 from coming loose. By the mechanism design and configuration of the mechanical device 1, the stability of connection between the rotor module 50 and the load mechanism input shaft 13 can be further improved.

Figure 5A:
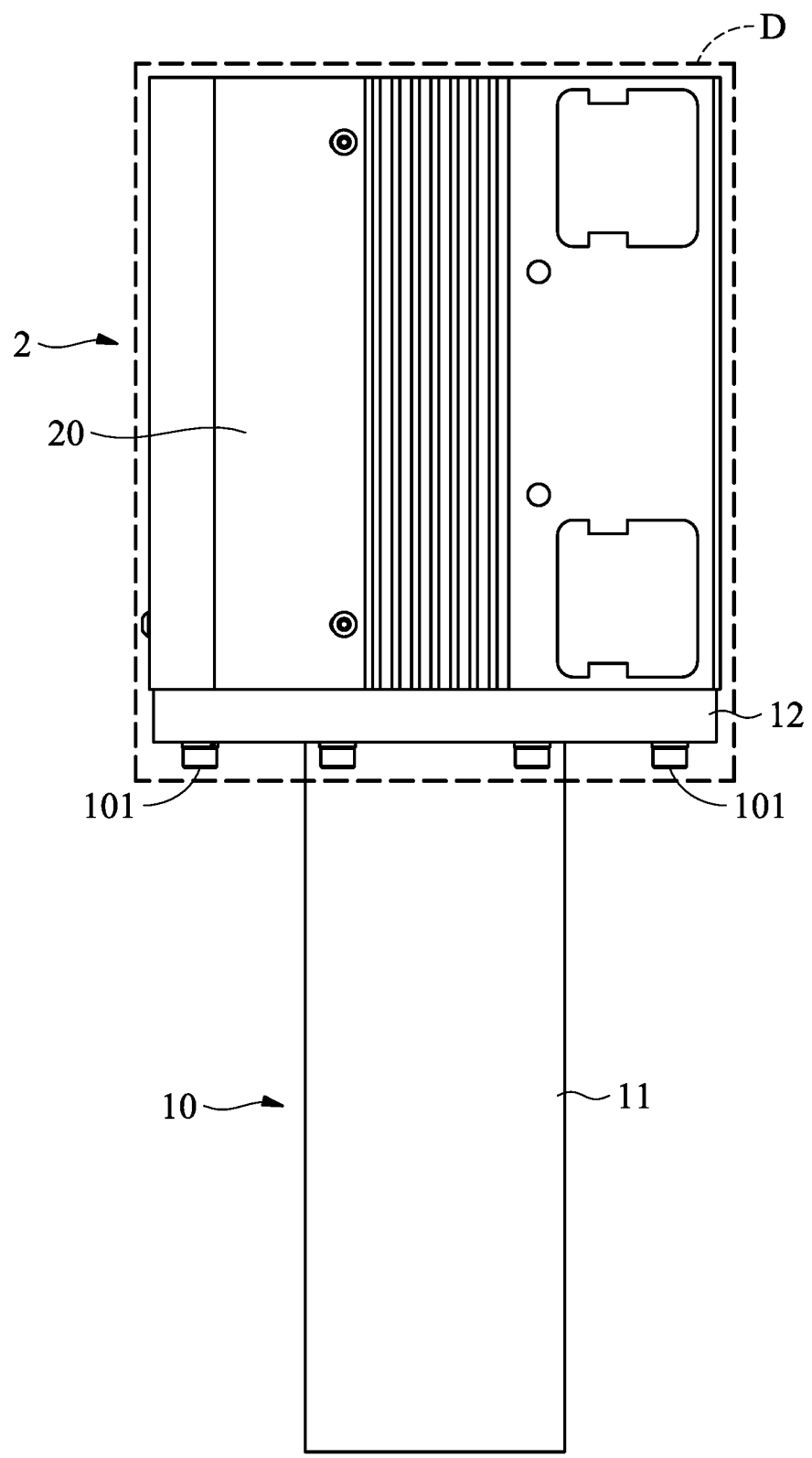
FIG. 5A is a schematic diagram showing the mechanical device 1 of FIG. 1A when the circuit box 30 and the end cover 40 are removed therefrom.
Figure 5B:
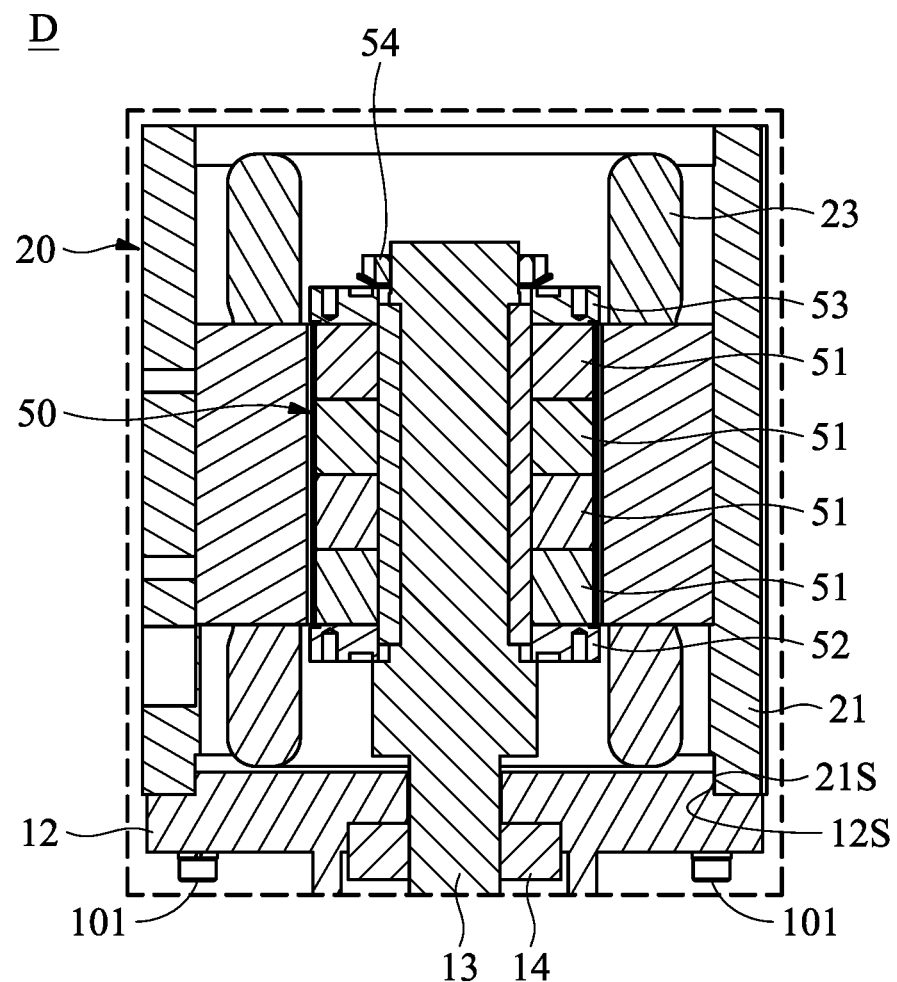
FIG. 5B is a cross-sectional view of the portion D in FIG. 5A.

FIGS. 5A to 5B show the mechanical device 1 when the circuit box 30 and the end cover 40 are removed therefrom. As illustrated in FIG. 5B, the load mechanism flange 12 has a load mechanism flange surface 12S, and the housing 21 has a stator flange surface 21S. The load mechanism flange surface 12S and the stator flange surface 21S are substantially parallel to the axis direction of the load mechanism input shaft 13 and in contact with each other. In this embodiment, since the load mechanism flange surface 12S and the stator flange surface 21S can be aligned with each other, precise coaxial alignment of the stator 20 and the load mechanism input shaft 13 can be achieved, and coaxial error therebetween can be efficiently reduced.

According to the motor mechanism of the embodiments, the load mechanism input shaft can be directly used as the driving shaft of the motor, so that the disadvantages of low efficiency, high dimensions, and coaxial error when using additional shaft coupling elements can be overcome. Additionally, since the rotor module comprises a plurality of rotor elements, the number of rotor elements can be adjusted to meet the size and specification of the motor, thus also reducing time and cost for functional test and maintenance.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A mechanical device, comprising:
a bearingless motor, comprising:
a rotor module, comprising a plurality of rotor elements;
a stator, wherein the rotor module is disposed in the stator and rotatable relative to the stator;
a load mechanism, comprising:
a load mechanism input shaft, having a first end and a second end, wherein the first end of the load mechanism input shaft is extended to the inside of the rotor module to serve as a power output shaft of the bearingless motor, wherein the rotor elements are disposed around the first end of the load mechanism input shaft;
wherein the rotor module further comprising a first fixed member and a second fixed member, wherein the rotor elements are disposed between the first fixed member and second fixed member and surround the first end of the load mechanism input shaft, and the first fixed member and second fixed member secure the rotor elements on the load mechanism input shaft,
wherein the rotor module further comprises a loose-proof assembly disposed around the load mechanism input shaft and abutting the second fixed member, to prevent the rotor elements and the first fixed member and second fixed member from becoming separated from the load mechanism input shaft, and the load mechanism input shaft further has a fixed surface forming a threaded structure corresponding to the loose-proof assembly; and
a main body, disposed around the second end of the load mechanism input shaft, wherein the second end of the load mechanism input shaft is located in the main body.

2. The mechanical device as claimed in claim 1, wherein the load mechanism input shaft further has an abutting surface substantially perpendicular to an axial direction of the load mechanism input shaft and abutting the first fixed member.

3. The mechanical device as claimed in claim 1, wherein the bearingless motor further comprises an end cover disposed at an end of the stator.

4. The mechanical device as claimed in claim 1, wherein the loose-proof assembly comprises a loose-proof nut and a loose-proof washer, and the loose-proof washer is disposed between the loose-proof nut and the second fixed member.

5. The mechanical device as claimed in claim 4, wherein the loose-proof nut forms at least a recess, and the loose-proof washer forms at least a fin folded into the recess, wherein the width of the recess substantially equals the width of the fin.

6. The mechanical device as claimed in claim 1, wherein the load mechanism further comprises a load mechanism flange connected to the main body.

7. The mechanical device as claimed in claim 6, wherein the load mechanism flange has a load mechanism flange surface, and the stator comprises a housing having a stator flange surface, wherein the load mechanism flange surface and the stator flange surface are substantially parallel to an axis direction of the load mechanism input shaft and in contact with each other.

8. The mechanical device as claimed in claim 6, wherein the load mechanism further comprises a fastener extended through the load mechanism flange to affix the load mechanism to the stator.

9. The mechanical device as claimed in claim 6, wherein the load mechanism further comprises a bearing disposed on an inner side of the load mechanism and around the second end of the load mechanism input shaft.

10. A bearingless motor, comprising:
- a rotor module, comprising a plurality of rotor elements
  - wherein the rotor module further comprising a first fixed member and a second fixed member, wherein the rotor elements are disposed between the first fixed member and second fixed member and surround a first end of a load mechanism input shaft, and the first fixed member and second fixed member secure the rotor elements on the load mechanism input shaft,
  - wherein the rotor module further comprises a loose-proof assembly disposed around the load mechanism input shaft and abutting the second fixed member, to prevent the rotor elements and the first fixed member and second fixed member from becoming separated from the load mechanism input shaft, and the load mechanism input shaft further has a fixed surface forming a threaded structure corresponding to the loose-proof assembly; and
- a stator, comprising a housing having a receiving space for receiving the rotor module, wherein the rotor module is rotatable relative to the stator.

11. The bearingless motor as claimed in claim 10, wherein there is no bearing disposed in the receiving space of the housing.

* * * * *